United States Patent

[11] 3,585,509

[72] Inventors Robert D. Davis
Spring Valley;
Norman F. Stellman, San Diego, both of, Calif.
[21] Appl. No. 763,332
[22] Filed Sept. 27, 1968
[45] Patented June 15, 1971
[73] Assignee Spectral Dynamics Corporation
San Diego, Calif.

[54] LOGARITHM FREQUENCY CONVERTER
14 Claims, 2 Drawing Figs.

[52] U.S. Cl. .......... 328/145, 328/151, 307/229, 307/233
[51] Int. Cl. .......... H04b 1/04
[50] Field of Search .......... 328/151, 140, 145; 307/233, 229

[56] References Cited
UNITED STATES PATENTS

| | | | |
|---|---|---|---|
| 3,466,526 | 9/1969 | Cole | 328/140 |
| 3,466,550 | 9/1969 | Wolf et al. | 328/140 |
| 2,810,107 | 10/1957 | Sauber | 323/66 |

*Primary Examiner*—Stanley D. Miller, Jr.
*Assistant Examiner*—Harold A. Dixon
*Attorney*—Carl R. Brown ABSTRACT: A logarithm frequency converter produces a logarithm DC output proportional to the frequency of an input signal by providing control pulses for each cycle, which control pulses time the charge of a storage unit and a transfer of a portion of the stored charge into a hold storage unit, which charge in the hold storage unit is processed by a logarithm converter to a DC logarithm output signal that is proportional to the frequency of the input signal.

INVENTOR.
NORMAN F. STELLMAN
ROBERT D. DAVIS
BY Carl R. Brown
ATTORNEY

INVENTOR.
NORMAN F. STELLMAN
ROBERT D. DAVIS
BY Carl R. Brown
ATTORNEY

LOGARITHM FREQUENCY CONVERTER

BACKGROUND OF THE INVENTION

There are several known logarithm frequency converters. In general, these logarithm frequency converters follow one of two circuit design approaches in providing a logarithm output proportional to the frequency of an input signal. Both of these design approaches usually require a low-pass filter, which low-pass filter has a relatively long response time. One known circuit uses multiple arranged discriminators that provide an analog output signal that is proportional to the frequency. This circuit requires other circuit means to change the analog signal to a logarithm signal. The time of operation of this design approach is slow because it is limited by the time constant of the discriminator circuits and the low-pass filter. Further, expensive banks of discriminator circuits are required which banks have to be switched into the circuit to provide more usable time constants. This switching of the discriminator circuits is not only time consuming and unhandy, but often introduces transients into the overall system and into the output signal. Another known circuit employs pulse-counting circuits to provide a logarithm output signal that is proportional to the pulse count rate of the input signal. This design approach has the inherent limitation of pulse count circuits as well as the long time constant of the low-pass filter. In addition, both the discriminator design approach and the pulse count design approach requires the input frequency signal to have a substantially uniform waveform and requires the use of expensive and complicated circuits.

It is therefore advantageous to have a logarithm frequency converter that creates a direct current signal proportional to the logarithm of the frequency of an input signal, has a relatively fast operational time, does not require low-pass filters, does not require symmetrical input signals, employs simplified circuitry that does not introduce transients and drifts into the output signal, and in which converter, frequency ranges can be easily and quickly changed.

SUMMARY OF THE INVENTION

In an embodiment of the logarithm frequency converter, a limiter circuit limits the magnitude of the input frequency signal to a set constant magnitude. The limited signal is then frequency divided to a suitable frequency and fed to a one-shot multivibrator circuit that responds with an output pulse for each cycle of the frequency divided signal. A flip-flop circuit, in response to the one-shot multivibrator circuit output, switches a DC current source to charge given storage capacitors for time periods determined by the frequency of the output pulses of the one-shot multivibrator. The increasing charge in the storage capacitors has a ramp waveform shape that reaches a peak magnitude that is proportional to the time interval of a cycle of the input signal. Output control signals from the one-shot multivibrator in coincidence with output signals from the flip-flop circuit, gates output signals from the stored charge in the storage capacitors to a holding capacitor. The charge in the holding capacitor is applied to a logarithm converter circuit to provide a logarithm DC output signal proportional to the frequency of the input frequency signal.

Separate storage capacitor circuits are provided for each output condition of the flip-flop circuit. When one storage capacitor circuit is charging, the other capacitor circuit is discharging. A time delay between the leading edge of the output pulse from the one-shot multivibrator and the resultant change of state by the flip-flop circuit is utilized to interrogate the particular charge in a storage capacitor circuit and apply the peak charge of the ramp charge to the holding capacitor. Thus each storage capacitor circuit is alternately charged and interrogated or discharged for each output pulse of the one-shot multivibrator and for each state of the flip-flop circuit. This makes the charging of the storage capacitor circuits and the holding capacitor charge responsive to each cycle of the input signal. The response time of the circuit is such that the level in the holding capacitor is reflective of the frequency of the input signal within a time constant of approximately one to two cycles. The logarithm frequency converter circuit of this invention is not limited by long time constants and is responsive to providing a DC logarithm output signal that is immediately reflective of the frequency of an input signal, regardless of the waveform of the input signal.

It is therefore an object of this invention to provide a new and improved logarithm frequency converter.

It is another object of this invention to provide a new and improved logarithm frequency converter that provides a logarithm DC output proportional to the frequency of an input signal irrespective of rapid changes in the frequency of the input signal or changes in the waveform of the input signal.

It is another object of this invention to provide a new and improved logarithm frequency converter that has simplified circuit operation, does not experience transients in switching circuit components, that employs less expensive and more reliable circuits and that doesn't require a low-pass filter.

Other objects and many advantages of this invention will become more apparent upon a reading of the following detailed description and an examination of the drawing wherein like referenced numerals designate like parts throughout and in which.

Figure 1:
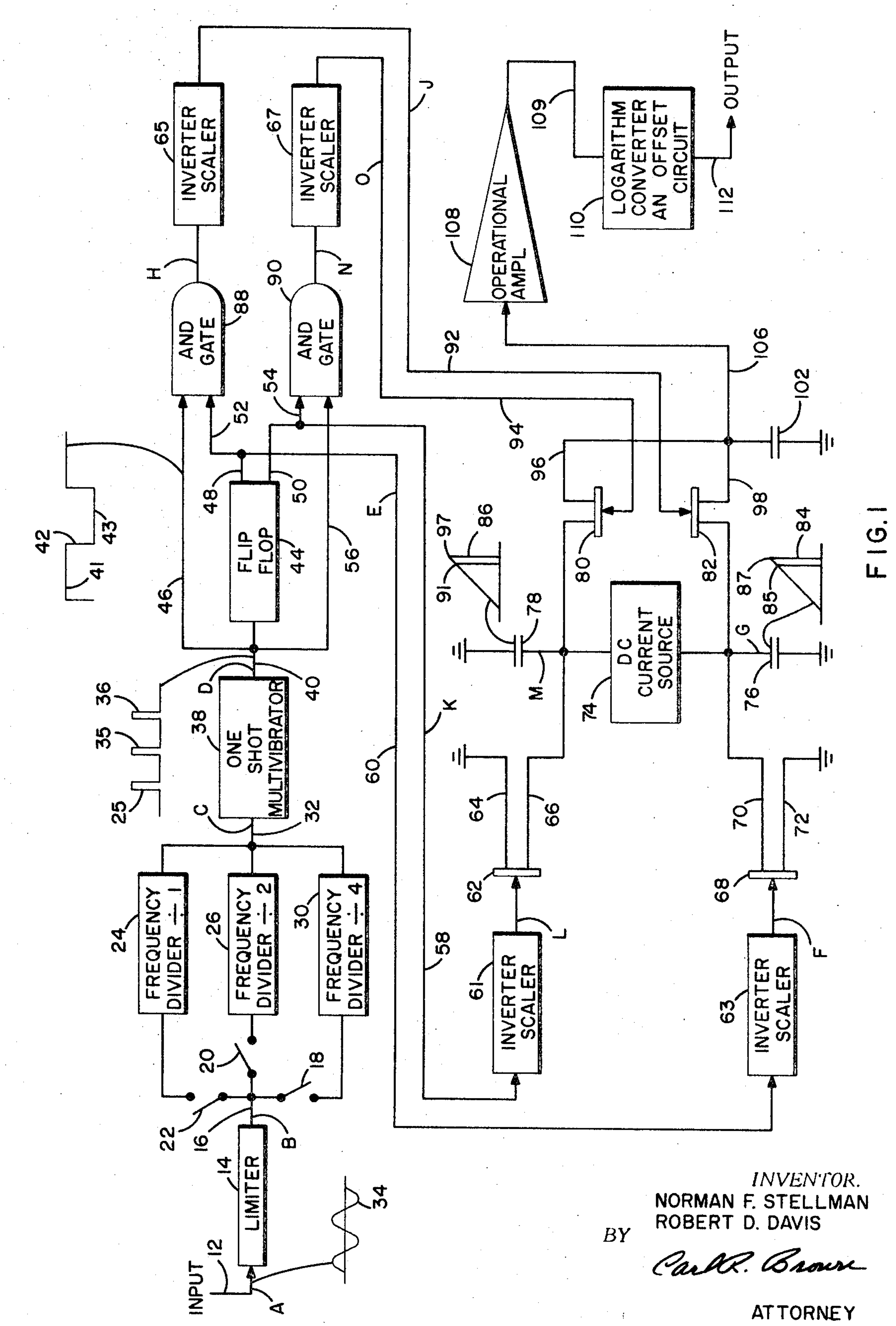
FIG. 1 is a block diagram of an embodiment of the logarithm frequency converter of this invention.

Referring now to FIG. 1, an input signal 34 having a given frequency that may selectively vary is applied to a known limiter circuit 14 through input line 12. The known limiter circuit 14 functions in the known manner to clip the input signal providing a substantially square wave signal 25 through line 32 to a one-shot multivibrator circuit 38. Switches 18, 20, and 22 are selectively closed to reduce the frequency of the input signal to the range of the other circuit parameters to an on-scale output signal at line 112. The frequency divider circuits 24, 26, and 30 are illustrative of any number of frequency divider circuits that can be switched into the circuit, and which circuits may comprise known frequency-dividing flip-flop circuits.

The one-shot multivibrator 38 in response to the positive going portion of the square wave signal in line 32 provides an output pulse of a given short time duration for each cycle through line 40 to a known flip-flop circuit 44. The flip-flop circuit 44 has the two condition outputs to lines 48 and 50. In one condition the flip-flop circuit 44 provides an output to the inverter scaler 61 and in the other condition provides an output signal to the inverter scaler circuit 63. The inverter scaler circuit inverts and scales the output from flip-flop 44 to the desired polarity and voltage range for energizing the respective field effect transistors 62 and 68.

Each line output from the flip-flop circuit 44, as for example the output signal in lines 48 and 60, in its correct time sequence provides an output signal through the inverter scaler 63 to the field effect transistor 68 that energizes the field effect transistor 68. At the same time the line output from the flip-flop circuit 44 to lines 50 and 58 is logically cut off, deenergizing the field effect transistor 62. Thus simultaneously, the transistor 68 short circuits to ground through lines 70 and 72 the accumulated charge on holding capacitor 76 and opens the short circuit to ground through lines 64 and 66, allowing holding capacitor 78 to charge. The DC current from the current source 74 flows into the holding capacitor 78 in the form of a ramp voltage buildup having a wave shape substantially conforming to the wave shape 86.

Upon the next cycle, the one-shot multivibrator 38 supplies another short duration pulse to the flip-flop circuit 44 that changes its state. Accordingly the flip-flop output is switched from line 60 to line 58. This deenergizes transistor 68 and energizes transistor 62. As a result, the short circuit through lines 70 and 72 is opened and a short circuit through lines 64 and 66 is closed. It may thus be understood that ramp charges alternately build up and are discharged in storage capacitors 76 and 78 with each change occurring with each cycle of the input signal in line 32.

The field effect transistors 80 and 82 are alternately energized for short time durations and for each frequency cycle to interrogate the charge magnitude on the respective storage capacitors 76 and 78. These charges are passed through the respectively energized transistors 80 and 82 to the holding capacitor 102. For example, the field effect transistor 82 is energized in a manner that will be described in more detail hereinafter with a portion of the charge in storage capacitor 76 discharging to the holding capacitor 102. Since the holding capacitor 102 has a capacity of approximately one-tenth that of capacitor 76, the holding capacitor 102 rapidly assumes a charge corresponding to the peak voltage 85 of the voltage in the storage capacitor 76. The output voltage representing the stored voltage in the holding capacitor 102 is applied to a high-impedance operational amplifier 108 that passes the signal with substantially no amplification through line 109 to a known logarithm converter circuit 110, that in turn converts the signal into the DC logarithm output in line 112 that is proportional to the frequency of the input signal 34.

The energizing of field effect transistors 80 and 92 is time sequenced so that these transistors are only on during the charging time of storage capacitors 76 and 78, which on time corresponds with the time interval between points 85 and 87 of the ramp voltage waveform 84 and between points 91 and 97 of the ramp voltage 86. This timing sequence is provided by flip-flop 44 changing states on the negative going portions 35 and 36 of the output pulses 25 from the one-shot multivibrator. Each output pulse of the one-shot multivibrator leads the response of the flip-flop circuit 44 by the time width of the output pulse from the one-shot multivibrator.

The output pulses of the one-shot multivibrator 38 are supplied through lines 46 and 56 to AND gates 88 and 90. Thus, one of the AND gates 88 or 90 passes a pulse having the time duration of one of the pulses 25, depending upon which output line of lines 52 and 54 is in the output condition. For example, when flip-flop 44 is providing an output to lines 52, then the next pulse from the one-shot multivibrator provides the coincidence in the AND gate 88 that supplies an output pulse to the inverter scaler 65 that energizes the transistor 80 for the time period between point 91 and point 97 of the ramp charge 86. Accordingly, during this time period the charge in the storage capacitor 78 is discharged to the summing capacitor 102. This interrogation of the charge in the storage capacitor 78 is timed to occur just before the flip-flop circuit 44 receives the termination of the pulse from the one-shot multivibrator that causes the flip-flop circuit to change states and energize transistor 62 to discharge the charge 86 to ground. Thus the timing sequence through the AND gates in each cycle interrogates the storage capacitor that has been charged, just before it is discharged and at a time when the charge is a maximum for the time cycle or frequency of the input signal. Since the magnitude of the charge passed to the holding capacitor 102 is dependent upon the magnitude of the charge on one or the other of the storage capacitors 76 and 78, the lower the frequency of the input signal, the larger the charge on the holding capacitor 102. It may thus be understood that for increasing input frequencies, the larger capacity storage capacitors can draw a charge from the holding capacitor 102 so that the charge in holding capacitor 102 is equal to the charge in the storage capacitors 76 and 78. The logarithm converter functions in the known manner to provide an output DC current that is the logarithm of the inverse of the charge in the holding capacitor 102.

Figure 2:
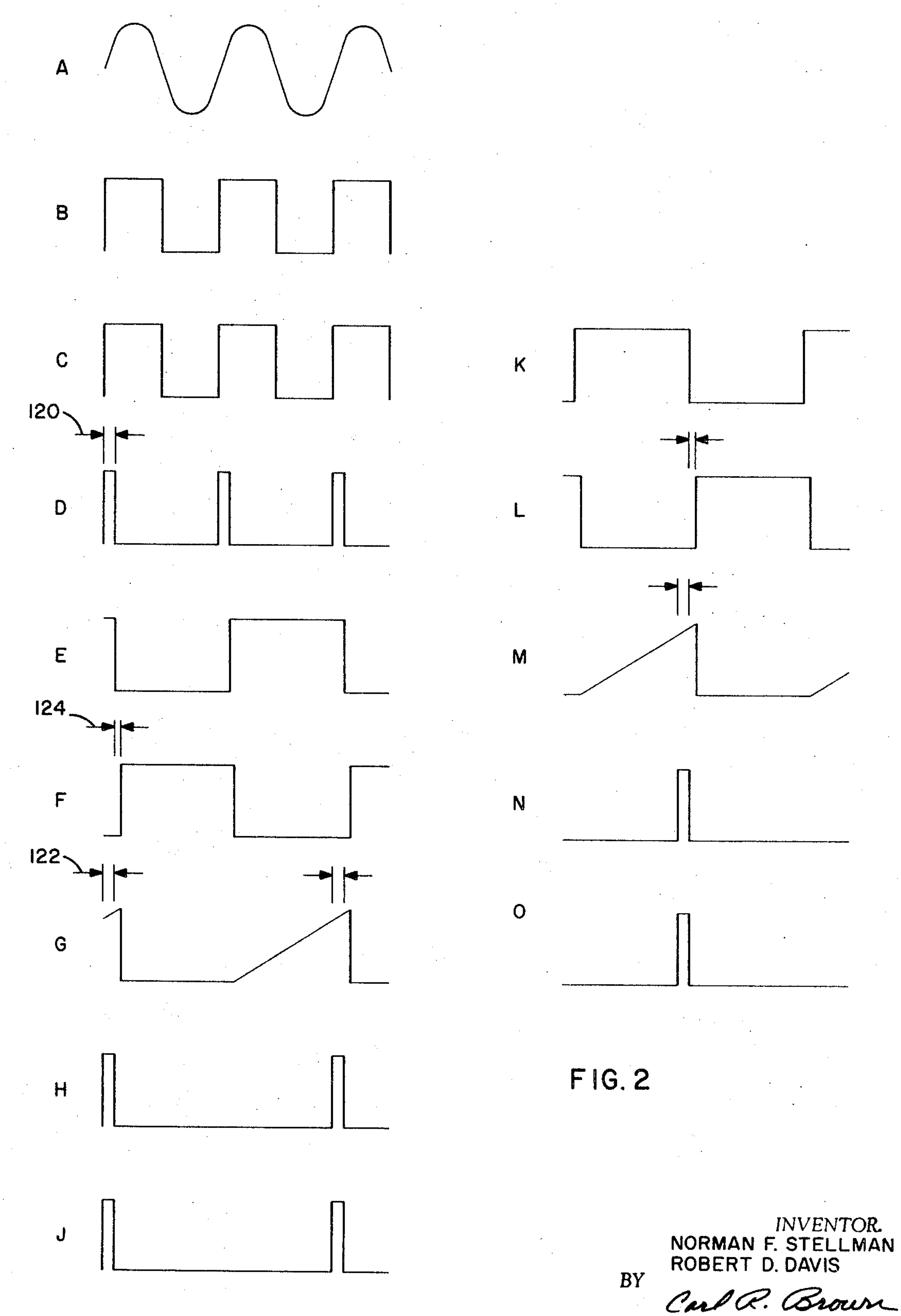
FIG. 2 is a diagram of a group of waveforms illustrating the timing relationships in the circuit.

In the time sequence of operation, referring to FIGS. 1 and 2, a sign wave A passes through the limiter 14 and frequency divider circuit 24 providing output waveforms B and C. The output pulses D of the one-shot multivibrator 38 change the state of the flip-flop 44, on the negative going portion of each pulse. For example the flip-flop circuit 44 has waveform E in line 60 and waveform K in line 58. The respective inverter scalers 61 and 63 invert and correctly scale the waveforms to waveform F that energizes the field effect transistor 68 and waveform L that deenergizes the field effect transistor 62. With the energizing of transistor 68, the capacitor 76 discharges to ground the previously charged condition as reflected by the waveform G and capacitor 78 charges giving waveform M.

In the timing sequence of the interrogation of the storage capacitors 76 and 78, the pulse width 120 of the waveform output D from the one-shot multivibrator, which may be in the order of 6 microseconds, is in coincidence with the existing level in line 60 corresponding to waveform E. The simultaneous signals provide an interrogation pulse waveform H and I through AND gate 88 and inverter scaler 65 to transistor 82. This pulse energizes the field effect transistor 82 that closes the circuit that charges holding capacitor 102 with the charge from the storage capacitor 76 during the time periods of 120 for waveform D and 122 for waveform G. The time delay 124 in the inverter scaler 63 as indicated in waveform F, allows the interrogation time of 120 and 122 to be completed before shorting the respective storage capacitor 76 to ground. The interrogation of storage capacitor 78 during the next cycle is in the same manner accomplished as previously described, as is illustrated in waveforms K, L, N, and O.

The logarithm converter and offset circuit 110 may comprise any known logarithm converter circuit and may, for example, comprise the known circuit of an operational amplifier with a gain that is controlled by the feedback through a transdiode. The impedance of the transdiode varies inversely and logarithmically with the current. The overall gain of the operational amplifier is caused to vary inversely and logarithmically providing a DC output that is the logarithm of the input frequency. The charge in the hold capacitor 102 is buffered by the unitary gain, operational amplifier 108.

Having described our invention, we now claim:

1. A logarithm frequency converter for providing a logarithm output proportional to the frequency of an input signal comprising, first means responsive to the input signal for providing output pulses at a rate proportional to the frequency of the input signal, storage means responsive to said output pulses for storing voltages having a magnitude buildup proportional to the time width of said output pulses, gating means responsive to said output pulses for sequentially gating said stored voltage at the rate of said output pulses, holding means for holding said gated voltages, logarithm converter means for converting the voltage level stored in said second holding means to a logarithm voltage output, said first means comprising a one-shot multivibrator circuit and a flip-flop circuit, said one-shot multivibrator circuit for providing an output pulse at the start of each cycle of the received signal, said flip-flop circuit responsive to said one-shot multivibrator output pulses for changing states at the termination of said one-shot multivibrator output pulses, said storage means including a current source and a pair of separate chargeable capacitor means, said storage means including means responsive to the two states of said flip-flop circuit for alternately charging and discharging said capacitor means upon the changing of states of said flip-flop circuit, said gate means comprising first and second gates for providing first and second gating pulses with said first gates electrically responsive to the coincidence of said output pulse of said one-shot multivibrator circuit and one state of said flip-flop circuit and said second gate electrically responsive to the coincidence of said output pulses of said one-shot multivibrator circuit and the other state of said flip-flop circuit, said holding means comprising a capacitor circuit having a charging time that is substantially less than the charging time of said capacitor means,
and means responsive to said gating pulses for applying the charge in charged ones of said first and second capacitor means to said capacitor circuit.

2. A logarithm frequency converter for providing a logarithm output proportional to the frequency of an input signal comprising,
first means responsive to the input signal for providing output pulses at a rate proportional to the frequency of the input signal,
storage means responsive to said output pulses for storing voltages having a magnitude buildup proportional to the time width of said output pulses,
gating means responsive to said output pulses for sequentially gating said stored voltage at the rate of said output pulses,
holding means for holding said gated voltages,
logarithm converter means for converting the voltage level stored in said second holding means to a logarithm voltage output,
said gated voltages having a magnitude proportional to the time interval of each cycle of the input signal,
said logarithm converter providing a DC output that is the logarithm of the inverse magnitude of the voltage magnitude in said holding means,
said output pulses comprising first pulses and second pulses with each of said first pulses having a time duration that is substantially less than the time interval of each cycle,
and said gating means being energized for a time period substantially equal to the time duration of said first pulses.

3. A logarithm frequency converter for providing a logarithm output proportional to the frequency of an input signal comprising,
first means responsive to the input signal for providing output pulses at a rate proportional to the frequency of the input signal,
storage means responsive to said output pulses for storing voltages having a magnitude buildup proportional to the time width of said output pulses,
gating means responsive to said output pulses for sequentially gating said stored voltage at the rate of said output pulses,
holding means for holding said gated voltages,
logarithm converter means for converting the voltage level stored in said second holding means to a logarithm voltage output,
said output pulses comprises first pulses and second pulses,
said first means including third means for providing said first pulse for each cycle of the input signal which first pulse has a time duration less than the time duration of said cycle,
fourth means responsive to said first pulse for providing said second pulse to said first storage means for a time duration that is substantially equal to the time duration of said cycle,
each of said second pulses occurring a given time after the start of each cycle,
said gating means is responsive to the coincidence of said second pulse for one cycle of the input signal and said first pulse for the next succeeding cycle for gating said stored voltage in said first storage means that increased during said one cycle,
said storage means comprises first and second storage means with each of said first and second storage means having a charging circuit and a discharging circuit,
and means in said storage means and responsive to said second pulses for energizing said charging circuit of said first storage means and energizing said discharging circuit of said second storage means for one cycle and energizing said charging circuit of said second storage means and energizing said discharging circuit for said first storage means for the next succeeding cycle.

4. A logarithm frequency converter as claimed in claim 3 in which, said gating means providing gating pulses for alternately gating the stored voltage in said charging circuits in time sequence with the start of each cycle and for a time duration substantially equal with the time duration of said first pulses.

5. A logarithm frequency converter as claimed in claim 3 including,
limiter means for limiting the magnitude of the input signal and providing a magnitude limited signal to said first means.

6. A logarithm frequency converter as claimed in claim 5 including,
frequency divider means electrically positioned between said limiter means and said first means for selectively dividing the frequency of the input signal.

7. A logarithm frequency converter for providing a logarithm output proportional to the frequency of an input signal comprising,
first means responsive to the input signal for providing output pulses at a rate proportional to the frequency of the input signal,
a constant current source,
storage means responsive to said output pulses and said constant current source for storing voltages from said constant current source having a magnitude buildup proportional to the time width of said output pulses,
gating means responsive to said output pulses for sequentially gating said stored voltage at the rate of said output pulses,
said constant current source is electrically connected to supply constant current to said storage means when said gating means is sequentially gated,
holding means for holding said gated voltages,
and logarithm converter means for converting the voltage level stored in said second holding means to a logarithm voltage output.

8. A logarithm frequency converter as claimed in claim 7 in which,
said first means comprising a one-shot multivibrator circuit and a flip-flop circuit,
said one-shot multivibrator circuit for providing an output pulse at the start of each cycle of the received signal,
said flip-flop circuit responsive to said one-shot multivibrator output pulses for changing states at the termination of said one-shot multivibrator output pulses,
said storage means including a current source and a pair of separate chargeable capacitor means,
said storage means including means responsive to the two states of said flip-flop circuit for alternately charging and discharging said capacitor means upon the changing of states of said flip-flop circuit,
said gate means comprising first and second gates for providing first and second gating pulses with said first gates electrically responsive to the coincidence of said output pulse of said one-shot multivibrator circuit and one state of said flip-flop circuit and said second gate electrically responsive to the coincidence of said output pulses of said one-shot multivibrator circuit and the other state of said flip-flop circuit,
said holding means comprising a capacitor circuit having a charging time that is substantially less than the charging time of said capacitor means,
and means responsive to said gating pulses for applying the charge in charged ones of first and second capacitor means to said capacitor circuit.

9. A logarithm frequency converter as claimed in claim 7 in which,
said output pulses comprises first pulses and second pulses,
said first means including third means for providing said first pulse for each cycle of the input signal which first pulse has a time duration less than the time duration of said cycle,
and fourth means responsive to said first pulse for providing said second pulse to said first storage means for a time duration that is substantially equal to the time duration of said cycle, each of said second pulses occurring a given time after the start of each cycle, said gating means is responsive to the coincidence of said second pulse for one cycle of the input signal and said first pulse for the next succeeding cycle for gating said stored voltage in said first storage means that increased during said one cycle, said storage means comprises first and second storage means with each of said first and second storage means having a charging circuit and a discharging circuit, and means in said storage means and responsive to said second pulses for energizing said charging circuit of said first storage means and energizing said discharging circuit of said second storage means for one cycle and energizing said charging circuit of said second storage means and energizing said discharging circuit for said first storage means for the next succeeding cycle.

10. A logarithm frequency converter as claimed in claim 9 in which, said gating means providing gating pulses for alternately gating the stored voltage in said charging circuits in time sequence with the start of each cycle and for a time duration substantially equal with the time duration of said first pulses.

11. A logarithm frequency converter as claimed in claim 7 including, limiter means for limiting the magnitude of the input signal and providing a magnitude limited signal to said first means.

12. A logarithm frequency converter as claimed in claim 11 including, frequency divider means electrically positioned between said limiter means and said first means for selectively dividing the frequency of the input signal.

13. A logarithm frequency converter as claimed in claim 7 in which, said gated voltages having a magnitude proportional to the time interval of each cycle of the input signal, and said logarithm converter providing a DC output that is the logarithm of the inverse magnitude of the voltage magnitude in said holding means.

14. A logarithm frequency converter as claimed in claim 13 in which, said output pulses comprising first pulses and second pulses with each of said first pulses having a time duration that is substantially less than the time interval of each cycle, and said gating means being energized for a time period substantially equal to the time duration of said first pulses.